C. PULFRICH.
GLASS MEASURING SCALE.
APPLICATION FILED FEB. 18, 1908.

917,132.

Patented Apr. 6, 1909.

Witnesses:
Paul Krüger
Fritz Sander

Inventor:
Carl Pulfrich

UNITED STATES PATENT OFFICE.

CARL PULFRICH, OF JENA, GERMANY, ASSIGNOR TO THE FIRM OF CARL ZEISS, OF JENA, GERMANY.

GLASS-MEASURING SCALE.

No. 917,132.      Specification of Letters Patent.      Patented April 6, 1909.

Application filed February 18, 1908. Serial No. 416,488.

*To all whom it may concern:*

Be it known that I, CARL PULFRICH, doctor of philosophy, a citizen of the German Empire, and residing at Carl-Zeiss strasse, Jena, in the Grand Duchy of Saxe-Weimar, Germany, have invented a new and useful Glass-Measuring Scale, of which the following is a specification.

The present invention relates to annular glass measuring scales, the rulings of which are not situated on the back thereof, but on the face turned toward the observer. In consequence of this invention the effect is obtained in such scales, that the strokes on the ruled face appear dark on a bright ground, without the necessity arising of having to illuminate a face of the scale other than that one, which evidently has to lie free, namely, the face ruled. To accomplish this it is necessary, firstly, to make the cross section of the scale in such a manner, that the profile lines of the ruled face and the face lying behind it are slightly inclined one to the other, and, secondly, to silver this hinder face. Light falling on the ruled face in the plane of the profile with a certain obliquity of incidence from the one side is, as regards that part which enters the glass, then reflected from the silvered face, so that it passes out through the ruled face unrefracted, that is, normal and opposite to the direction of view of the observer. In such illumination the strokes on the ruled face appear to the observer all the more dark and the ground bright, as that part of the obliquely incident rays, which is directly reflected from the ruled face, does not reach the eye of the observer.

Figure 1:
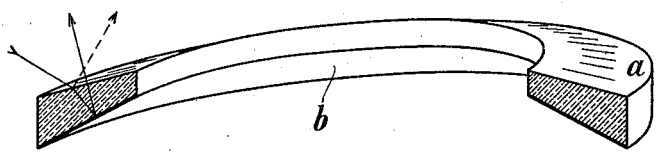
Figure 2:
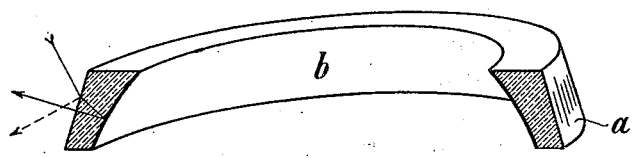
Figure 3:
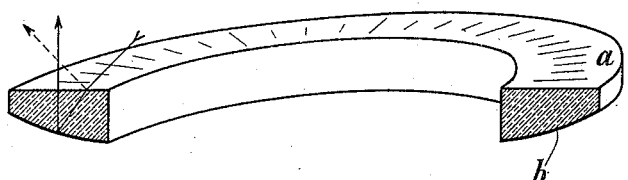

In the annexed drawing: Figure 1 is a perspective view of a half of an annular glass scale constructed according to the invention. Fig. 2 shows a half of another annular glass scale. Fig. 3 shows a half of a third annular glass scale.

Referring to Fig. 1, the path of one of the illuminating rays including that part reflected at the ruled face $a$ is shown. The hinder face $b$ is the silvered one indicated by heavy ruling in the section of the scale. The ruled face $a$ is flat conical. The silvered face $b$ is likewise made conical.

In the annular glass scales according to Figs. 2 and 3, in place of the former straight line profile of the hinder face $b$ an arc of a circle is substituted, the center of which lies in the axis of the ring. The silvered faces are consequently spherical surfaces. These have the advantage over conical surfaces in that they cost less to grind and polish. In the example Fig. 2 the rulings are placed upon the steep conical face, in Fig. 3 upon the plane face. The hinder face $b$ in Fig. 3 is convex spherical, because it is assumed that light comes from the inner side of the ring.

I claim:

1. An annular glass measuring scale in which the face opposite to the ruled face is silvered and its profile line is slightly inclined to the profile line of the ruled face.

2. An annular glass measuring scale in which the face opposite to the ruled face is spherical and silvered and the chord of its profile arc is slightly inclined to the profile line of the ruled face.

CARL PULFRICH.

Witnesses:
    PAUL KRÜGER,
    FRITZ SANDER.